United States Patent
Fang et al.

(10) Patent No.: US 9,459,724 B2
(45) Date of Patent: Oct. 4, 2016

(54) TOUCH TERMINAL, A NEAR-FIELD COMMUNICATION METHOD AND SYSTEM OF THE TOUCH TERMINAL

(71) Applicant: SHENZHEN HUIDING TECHNOLOGY CO., LTD., Shenzhen, Guangdong (CN)

(72) Inventors: Jun Fang, Guangdong (CN); Siqiu Cheng, Guangdong (CN)

(73) Assignee: SHENZHEN HUIDING TECHNOLOGY CO., LTD., Shenzhen (CN)

( * ) Notice: Subject to any disclaimer, the term of this patent is extended or adjusted under 35 U.S.C. 154(b) by 182 days.

(21) Appl. No.: 14/150,747

(22) Filed: Jan. 8, 2014

(65) Prior Publication Data
US 2014/0340325 A1    Nov. 20, 2014

(30) Foreign Application Priority Data
May 14, 2013 (CN) .......................... 2013 1 0177369

(51) Int. Cl.
*H04B 5/00* (2006.01)
*G06F 3/041* (2006.01)

(52) U.S. Cl.
CPC ........... *G06F 3/0416* (2013.01); *H04B 5/0031* (2013.01)

(58) Field of Classification Search
CPC .... H04B 5/00; H04B 5/0031; H04B 5/0062; H04B 5/0012; H04B 5/0025; G06F 3/0416; G06F 1/1698; H04W 4/008; H04W 76/028; H04W 76/02; H04M 1/7253; G09G 2370/22
USPC ....................... 345/173; 455/41.1, 41.2, 501
See application file for complete search history.

(56) References Cited

U.S. PATENT DOCUMENTS

| | | | |
|---|---|---|---|
| 2012/0040610 A1* | 2/2012 | Moosavi | H04W 52/0254 455/41.1 |
| 2013/0231046 A1* | 9/2013 | Pope | G06K 9/00013 455/41.1 |

FOREIGN PATENT DOCUMENTS

| | | | | |
|---|---|---|---|---|
| CN | 102081823 A | 6/2011 | | |
| CN | WO 2012071812 A1 * | 6/2012 | ............ | H04W 88/06 |
| CN | 102832975 A | 12/2012 | | |
| CN | 102916729 A | 2/2013 | | |

OTHER PUBLICATIONS

1st Office Action of counterpart Chinese Patent Application No. 201310177369.5 issued on Aug. 12, 2014.

* cited by examiner

*Primary Examiner* — Grant Sitta
*Assistant Examiner* — Amen Bogale (57) ABSTRACT

The disclosure provides a touch terminal, a near-field communication method and system of the touch terminal. The method includes: a second touch terminal receiving a wireless communication request of establishment of the near-field sent by first touch terminal touch through the near-field electric field; the second touch terminal sending a interference source peripherals closing signal to a main control chip, and informing the main control chip to close interference source peripherals; the first touch terminal and the second terminal establishing a wireless connection by touching near-field electric field, and exchange data. The disclosure enables to make the communication environment purified and guarantee the quality of communication.

7 Claims, 7 Drawing Sheets

The sender

| Touch detection | Proximity detection (the sender) | Touch detection | Proximity detection (the sender) |

The receiver

| Touch detection | Proximity detection (the receiver) | Touch detection | Proximity detection (the receiver) | Touch detection | Proximity detection (the receiver) |

Figure 7

| The sender | Transmit F1 | Transmit F1 | Transmit F1 | Transmit F2 | Detect F2 |
|---|---|---|---|---|---|
| The receiver | Detect F1 | Detect F1 | Detect F1 | Detect F2 | Transmit F2 |

Figure 8

TOUCH TERMINAL, A NEAR-FIELD COMMUNICATION METHOD AND SYSTEM OF THE TOUCH TERMINAL

CROSS-REFERENCE TO RELATED APPLICATIONS

This present application claims the benefit of Chinese Patent Application No. 201310177369.5 filed on May 14, 2013; the contents of which are hereby incorporated by reference.

TECHNICAL FIELD

The disclosure relates to the technical field of communications, and particularly relates to a touch terminal, a near-field communication method and system of the touch terminal.

BACKGROUND

At present, the widespread short-range wireless communication technology are Bluetooth, WLAN (Wi-Fi) and infrared data transmission (IrDA), as well as some of potential the short-range wireless technology standard, including ZigBee, ultra-wideband (Ultra Wideband, UWB), near field Communications (NFC), WiMedia, GPS (Global Positioning System), digital Enhanced cordless Telecommunications (DECT), the wireless 1394 standard and the private wireless system they have their own characteristics, or basing on the special requirements of the transmission speed, distance, power consumption, or focusing on the scalability features, or meeting certain specific requirements of a single application, or creating a competitive differentiation techniques, etc. but none of them can meet all demand.

Wherein, NFC is a high-frequency short-range wireless communications technology, which allows electronic devices to transfer and exchange data non-contact point to point within a range of between about ten centimeters. The technology is evolved from the contactless radio frequency identification (RFID), and can backward compatible with RFID, first successfully developed by Sony and Philips individually, and it mainly provide for mobile phones and other handheld devices to the machine-to-machine (M2M) communications. Because the near-field communication has a natural safety, therefore, NFC is considered to have great application prospects in the field of mobile payment. Meanwhile, because NFC has superior security than other wireless communication technologies, NFC is compared to a "security dialogue" between machines by alliance between schools and enterprises of Chinese internet of Things. NFC offers a simple, touch-based solution that allows consumers to exchange information with a simple and intuitive way to access content and services.

The existing antenna of NFC products mainly are made on one side of the cell, or attached to the inside of the shell, generally by making into a coil through a metal wiring on a printed circuit board (PCB) or a flexible circuit board and then are attached the PCB or FPC, which contain the coil, to the shell or the battery. The main disadvantages are as following: often removing battery and shell phase to phase, so that makes wiring of the NFC antenna easy to worn or produces the alignment issue, eventually leading to the antenna signal deterioration, and impact the use of NFC product features. In addition, NFC antenna products are generally located inside the shell of electronic products, if choosing to make shell by metallic materials, it will affect the spread of NFC signals For capacitive touch terminal, a better way of a communication is directly using its touch screen driver, line sensor line as near-field communications sending, the receiving channel. Through the above-multiplexed designs, designing without additional antenna for transmitting and receiving near field communication, there will not bring the above problems and production costs. However, in this way, because the signal which can be detected near field communication is weak, and is susceptible to interference from some peripherals in communications environment, they referred to as interference source peripherals, such as touch terminal of Liquid Crystal display (LCD), thus leading to can no guarantee of communication quality, and the interference becomes more apparent when the screen on the screen.

SUMMARY

The disclosure provides a near field communication method of the terminal touch in order to solve the technical problem of interference generated by interference source peripherals when having near field communication between the touch terminals in the communications environment.

The disclosure provides the following technical solutions:

A near field communication method of the terminal touch, which is used for near field communication between a first touch terminal and a second touch terminal, the method comprising:

the second touch terminal receiving a wireless communication request of establishment of the near-field sent by first touch terminal touch through the near-field electric field;

the second touch terminal sending a interference source peripherals closing signal to a main control chip, and informing the main control chip to close interference source peripherals;

the first touch terminal and the second terminal establishing a wireless connection by touching near-field electric field, and exchanging data.

Preferably, before the second touch terminal receiving a wireless communication request of establishment of the near-field sent by first touch terminal touch through the near-field electric field, the method further comprising:

the first touch terminal and the second touch terminal obtaining the user operation of opening near field communication function, and open near field communication function;

the first touch terminal detecting whether the second touch terminal is located in the communication range of the first touch terminal, if located, the first touch terminal send the wireless communication request of establishment of the near-field to the second touch terminal through the near-field electric field;

the second touch terminal detecting whether the first touch terminal is located in the communication range of the second touch terminal, if located, the second touch terminal receive a wireless communication request of establishment of the near-field sent by first touch terminal touch through the near-field electric field.

Preferably, the user operation of opening near field communication function including a user operation for selecting in the relevant menu of data to be transmitted and a user operation for opening near field communication function of the touch terminal in the touch terminal system settings;

the first touch terminal entering the proximity detection mode in the sending mode, for detecting whether the second touch terminal is located in the communication range of the first touch terminal;

the second touch terminal entering the proximity detection mode in the receiving mode, for detecting whether the first touch terminal is located in the communication range of the second touch terminal;

Preferably, the proximity detection duration of the first touch terminal is not less than sum of the touch detection duration of the second touch terminal and the two proximity detection duration;

when the touch detection and the proximity detection cannot be performed simultaneously, the touch detection and the proximity detection can be performed alternately after entering the proximity detection mode.

Preferably, the first touch terminal detecting whether the second touch terminal is located in the communication range of the first touch terminal comprises:

The first touch terminal detecting the second touch terminal locating in the communication range of the first touch terminal N times continuously, and judging the second touch terminal is located in the communication range of the first touch terminal, wherein N is a preset number, N≥1; the first touch terminal can not detect the first touch terminal locating in the communication range of the second touch terminal in a preset period of time, and judging the detecting fails, the first touch terminal quit the proximity detection mode and return to the normal touch detection mode; wherein the second touch terminal detecting whether the first touch terminal is located in the communication range of the second touch terminal comprises:

the second touch terminal detecting the first touch terminal locating in the communication range of the first touch terminal N times continuously, and judging the first touch terminal is located in the communication range of the second touch terminal, wherein N is a preset number, N≥1.

Preferably, after the second touch terminal sending an interference source peripherals closing signal to the main control chip, and informing the main control chip to close interference source peripherals, the method further comprising:

the main control chip judging whether the communication frequency between the second touch terminal and the first touch terminal can avoid the interfering frequency of the interference source peripherals, if the judgment is YES, the first touch terminal and the second terminal establish a wireless connection by touching near-field electric field, and exchange data; if the judgment is NO, the main control chip close the interference source peripherals, then, the first touch terminal and the second terminal establish a wireless connection by touching near-field electric field, and exchange data.

Preferably, the first touch terminal detecting whether the second touch terminal is located in the communication range of the first touch terminal comprising:

the first touch terminal transmitting a particular undisturbed beacon and detect whether there is a undisturbed beacon reply with a particular rule, so that detect whether the second touch terminal is located in the communication range of the first touch terminal; wherein the second touch terminal detects whether the first touch terminal is located in the communication range of the second touch terminal comprising:

the second touch terminal transmitting a particular undisturbed beacon and detect whether there is a undisturbed beacon reply with a particular rule, so that detect whether the first touch terminal is located in the communication range of the second touch terminal;

The disclosure also provides a near field communication system of the terminal touch, the system comprises:

a first touch terminal, which sends a wireless communication request of establishment of the near-field through a sending electrode;

a second touch terminal, which receives a wireless communication request of establishment of the near-field through a sending electrode sent by the first touch terminal through a receiving electrode, and sends a interference source peripherals closing signal to a main control chip, and inform the main control chip to close interference source peripherals.

The first touch terminal and the second terminal establish a wireless connection by touching near-field electric field, and exchange data.

The disclosure also provides a terminal touch, the touch terminal comprises:

a near field communication unit, which is established a wireless connection with the other touch terminal by touching near-field electric field for exchanging data; the near field communication unit include a sending electrode and a receiving electrode, the sending electrode send a wireless communication request of establishment of the near-field to the other touch terminal, the receiving electrode receive a wireless communication request of establishment of the near-field sent by the other touch terminal;

a control unit, which receives a wireless communication request of establishment of the near-field sent by the other touch terminal, and send a interference source peripherals closing signal to a main control chip, and inform the main control chip to close interference source peripherals.

Preferably, the sending electrode is a touchscreen driving electrode of the touch terminal, wherein the receiving electrode is a touchscreen sensing electrode of the touch terminal.

In the embodiment of the disclosure, the advantages as following: the touch terminal receiving a wireless communication request of establishment of the near-field sent by the other touch terminal through the near-field electric field, and informing the main control chip to close interference source peripherals, and then establishing a wireless connection to exchange data, so that the interference upon near field communication, by interference sources peripherals in the communication environment, can be avoided, and to make the communication environment purified and guarantee the quality of communication.

DETAILED DESCRIPTION OF THE EMBODIMENT

To make the objects, technical solutions and advantages of the disclosure will be clearer, the following drawings and embodiments of the disclosure will be described in detail. It should be understood that the specific embodiments described hereinafter are used to illustrate the disclosure but to limit the disclosure.

Embodiment 1

The embodiment 1 of the disclosure provides a near field communication method of the terminal touch.

Figure 1:
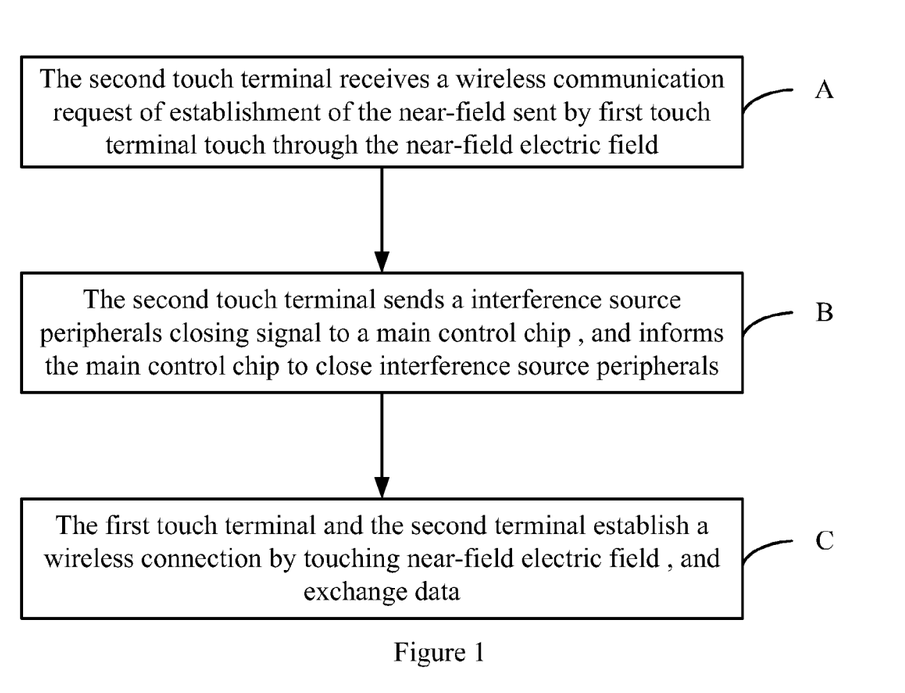
FIG. 1 shows a flowchart of the embodiment 1 of a near field communication method of the terminal touch according to the disclosure.

Referring to FIG. 1, which shows a flowchart of the embodiment 1 of a near field communication method of the terminal touch according to the disclosure, the method is used for near field communication between a first touch terminal and a second touch terminal. Both of the first touch terminal and the second touch terminal can be used as either the sending terminal or the receiving terminal, the touch terminal using the near field communication method has the function of sending date and receiving date at the same time. As the full duplex communication mode, the device can receive and send date simultaneously; As the half duplex communication mode, the device can not receive and send date simultaneously, which should be switched between the receiving mode and sending mode.

For ease of description, the first touch terminal is defined as the data sending terminal, and the second touch terminal is defined as the date receiving terminal in disclosure. The method included steps as below:

Step A: The second touch terminal receives a wireless communication request of establishment of the near-field sent by first touch terminal touch through the near-field electric field.

Step B: The second touch terminal sends an interference source peripherals closing signal to a main control chip, and informs the main control chip to close interference source peripherals.

Step C: The first touch terminal and the second terminal establish a wireless connection by touching near-field electric field, and exchange data.

Above-mentioned method will be stated in detail as below:

Before the first touch terminal send a wireless communication request of establishment of the near-field to the second touch terminal, the user can manually operate to open the near field communication function. Therefore, before step A, below steps can be executed.

The first touch terminal and the second touch terminal obtain the user operation of opening near field communication function, and open near field communication function;

The first touch terminal detect whether the second touch terminal is located in the communication range of the first touch terminal, if located, the first touch terminal send the wireless communication request of establishment of the near-field to the second touch terminal through the near-field electric field;

The second touch terminal detect whether the first touch terminal is located in the communication range of the second touch terminal, if yes, step A is to be executed.

Wherein, the user operation of opening near field communication function include a user operation for selecting in the relevant menu of data to be transmitted (the data sending terminal) and a user operation for opening near field communication function of the touch terminal in the touch terminal system settings (the data receiving terminal). In the specific application, the user of the data sending terminal can open the near field communication function by below methods, for instance, users click the sharing key of some date, and choose near field communication sharing date (method of screen to screen), to share date to other terminal, meanwhile, the terminal's near field function opens, and search other terminals as for electrically connect. After the user of the data receiving terminal open the near field communication function in the touch terminal system settings, the terminal will keep searching whether other terminals get close to (whether there are any other terminals are located at the range of communication).

The first touch terminal and the second touch terminal can enter the proximity detection mode respectively, which is under the sending mode and the receiving mode, to detect whether the touch terminal is located at the communication range of the other.

For the signal of near field communication is week, we could define the communication range within 10 millimeter, and the communication sending and receiving access between two touch terminals can copy touch screen's drive line and sense line, namely, the sending electrode of sending date (require) and the receiving date (require) are touch screen's drive electrode and sense electrode respectively. Through proximity detection, before two touch terminals are close to each other at the period, which means before two touch terminals do not at the range of communicating each other, the interference sources peripherals will be open. At the time, users can directly operate touch screen without effecting user's experience, to deduce the negative effect of experience when interfered. Supplemental instruction is that: the above-mentioned proximity detecting mode under sending mode and receiving mode can be switched by user, for instance, when user sends date to another device, he will use proximity detecting mode, in the related menu of sending date, by choosing sending mode, and the proximity detection mode is always existing under receiving mode because the mode is open in the system settings. The proximity detection mode of data sending terminal is superior to the proximity detection mode of data receiving terminal. Namely, when the user initiates communication, the mode can be switched to proximity detecting mode under the sending mode.

In the specific application, the detecting method, by checking whether another touch terminal is located at the range of communication, is preferred to being used. The touch terminal transmit a particular undisturbed beacon and detect whether t there is a undisturbed beacon reply with a particular rule, so that detect whether the other touch terminal is located at the range of communication. The method is adopting communicative shake-hand confirmation to detect the existence of another communication device.

Interference sources peripherals include but not limited to screen (such as LCD). Some modes, which can interfere near field communication and close it for a while, belong to interference sources peripherals. Interference sources peripherals can close in order to guarantee the communication quality, such as screen, touch-control detecting function mode, even GPS mode, WiFi mode and GSM/GPRS mode in which the touch-control detecting function mode date can open again when the date transfer and communication finish.

In the embodiment, when the touch terminal receive a wireless communication request of establishment of the near-field sent by the other touch terminal, the touch terminal would inform main control chip to close interference sources peripherals, specially screen, then set wireless connection and exchange date. The interference upon near field communication, by interference sources peripherals in the communication environment, can be avoided. The communication environment purified and quality of communication enhanced.

As an optimization of the embodiment, the judge whether the interference can be avoided or not, can be used to confirm whether interference sources peripherals need be close or not. The interference sources peripheral only need to be close when the communication frequency can not avoid the interference frequency. The optimization avoids unnecessary close of interference sources peripherals and optimizes user experience. The method can be used as configurable mode, to open and close the function according to actual application requirement. After the second touch terminal send interference sources peripherals signal to main control chip, to inform main control chip to close interference sources peripherals:

the main control chip judge whether the communication frequency between the second touch terminal and the first touch terminal can avoid the interference frequency of interference sources peripherals or not. If the judge result is yes, step C would be executed directly. If the result is no, main control chip close the interference sources peripherals, and then executed step C.

Embodiment 2

The embodiment 2 of the disclosure provides a near field communication system of the touch terminal.

Figure 2:
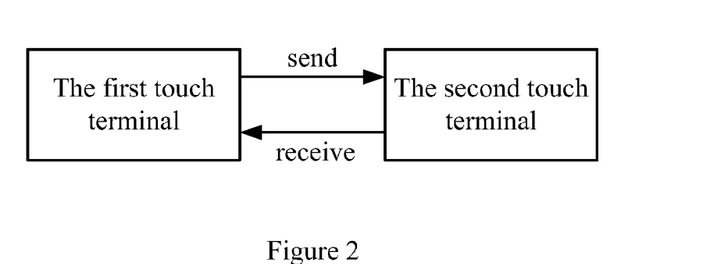
FIG. 2 shows a structure diagram of the embodiment 2 of a near field communication system of the terminal touch according to the disclosure.

Referring to FIG. 2, which shows a structure diagram of the embodiment 2 of a near field communication system of the touch terminal according to the disclosure, the method is used for near field communication between the first touch terminal and the second touch terminal. Both of the first touch terminal and the second touch terminal can be used as either the sending terminal or the receiving terminal, the touch terminal using the near field communication method has the function of sending date and receiving date at the same time. As the full duplex communication mode, the device can receive and send date simultaneously; As the half duplex communication mode, the device can not receive and send date simultaneously, which should be switched between the receiving mode and sending mode.

For ease of description, the first touch terminal is defined as the date sender, and the second touch terminal is defined as the date receiver. The system adopts the near field communication method which includes the first touch terminal and the second touch terminal, provided by embodiment 1, to communicate. The first touch terminal sends a wireless communication request of establishment of the near-field to the second touch terminal, and the second touch terminal receives a wireless communication request of establishment of the near-field sent by first touch terminal touch through the near-field electric field and sends a interference source peripherals closing signal to a main control chip, and informs the main control chip to close interference source peripherals. The first touch terminal and the second terminal establish a wireless connection by touching near-field electric field, and exchange data.

Wherein, the sending and receiving channel of communication between two touch terminals can copy and use drive line, sense line each other, which are the sending date (request) electrode and receiving date (request) electrode. Namely, the sending date (request) electrode and receiving date (request) electrode are drive electrode and sense electrode respectively.

In the embodiment, when the touch terminal receive a wireless communication request of establishment of the near-field sent by the other touch terminal, the touch terminal would inform main control chip to close interference sources peripherals, specially screen, then set wireless connection and exchange date. The interference upon near field communication, by interference sources peripherals in the communication environment, can be avoided. The communication environment purified and quality of communication enhanced.

Embodiment 3

The embodiment 3 of the disclosure provides a touch terminal.

Figure 3:
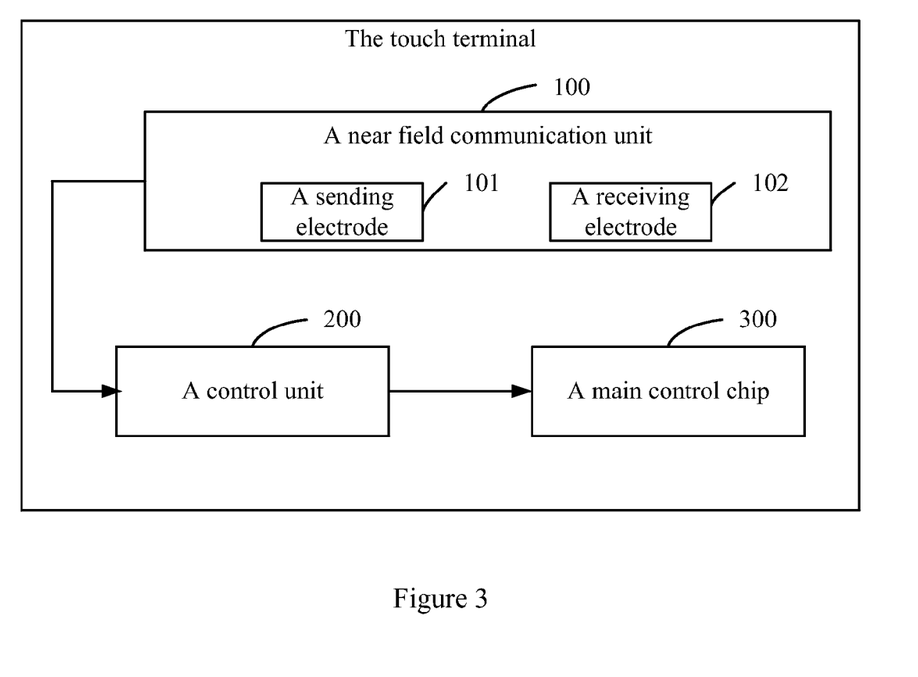
FIG. 3 shows a structure schematic diagram of the embodiment 3 of a touch terminal according to the disclosure.

Referring to FIG. 3, which shows a structure diagram of the embodiment 2 of a near field communication system of the touch terminal according to the disclosure, the method is used for near field communication between the first touch terminal and the second touch terminal. Both of the first touch terminal and the second touch terminal can be used as either the sending terminal or the receiving terminal, the touch terminal using the near field communication method has the function of sending date and receiving date at the same time. As the full duplex communication mode, the device can receive and send date simultaneously; As the half duplex communication mode, the device can not receive and send date simultaneously, which should be switched between the receiving mode and sending mode.

The touch terminal adopts the near field communication method which includes near field unit 100 and the control unit 200, provided by embodiment 1, to communicate. The near field unit 100 and another touch terminal build wireless connection and exchange date. Near field communication unit 100 includes sending electrode 101 and receiving electrode 102. The sending electrode 101 sends a wireless communication request of establishment of the near-field to another touch terminal, and receiving electrode 102 receives a wireless communication request of establishment of the near-field sent by another touch terminal touch through the near-field electric field and sends a interference source peripherals closing signal to a main control chip 300, and informs the main control chip 300 to close interference source peripherals.

Wherein, the sending and receiving channel of communication between two touch terminals can copy and use drive line, sense line each other, which are the sending date (request) electrode 101 and receiving date (request) electrode 102. Namely, the sending date (request) electrode 101 and receiving date (request) electrode 102 are drive electrode and sense electrode respectively.

In the embodiment, when the touch terminal receive a wireless communication request of establishment of the near-field sent by the other touch terminal, the touch terminal would inform main control chip to close interference sources peripherals, specially screen, then set wireless connection and exchange date. The interference upon near field communication, by interference sources peripherals in the communication environment, can be avoided. The communication environment purified and quality of communication enhanced.

Embodiment 4

The embodiment 4 of the disclosure provides a touch terminal as a date sender, which is called a first touch terminal hereafter, as date receiver as well. The embodiment mainly describes the flowchart of the touch terminal as date receiver. The component of the touch terminal has been described in detail in embodiment 3, which will not be described any more here.

Figure 4:
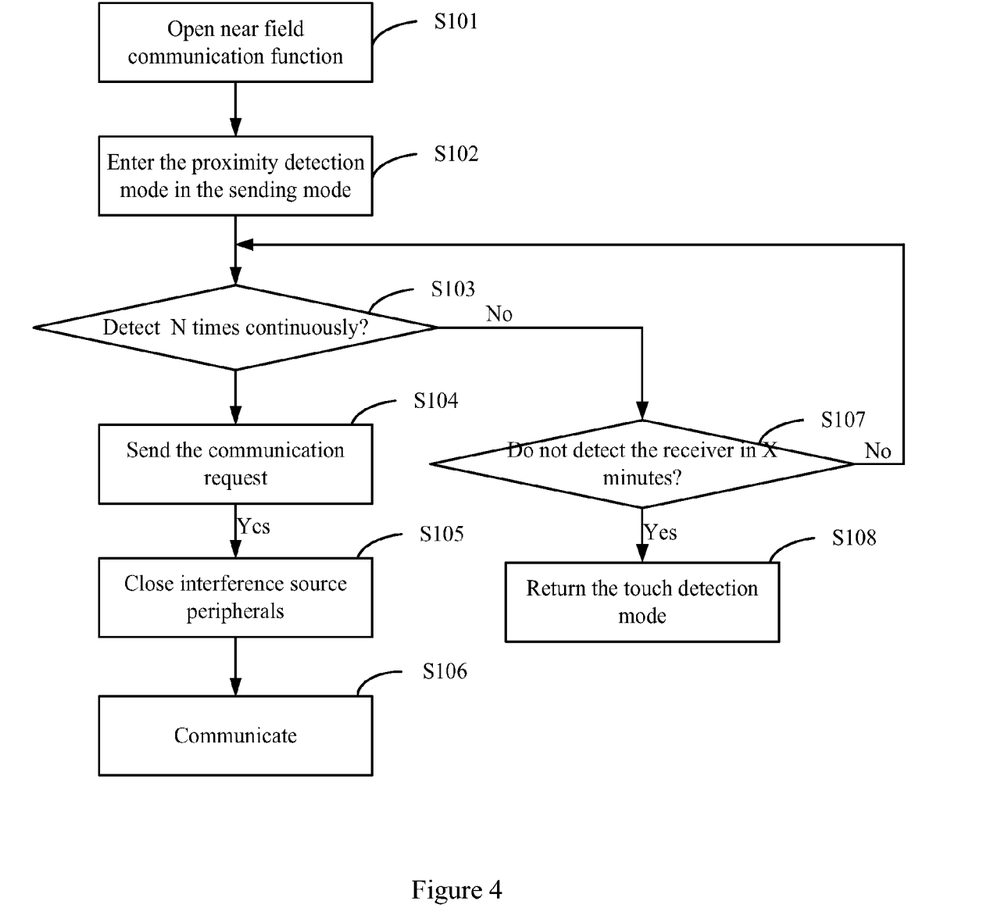
FIG. 4 shows a workflow chart of the embodiment 4 of the first touch terminal as being data sending terminal according to the disclosure.

Referring to FIG. 4, which shows a workflow chart of the embodiment 4 of the first touch terminal as being data sending terminal according to the disclosure, as below in detail:

Specifically, users' operating open near field communication function, for instance, users make choice in the related menu of to be send date, to open the near field communication function of touch terminal. The detail of application has been described in embodiment 1, which will not be described any more here.

Step S102: Enter the proximity detection mode in the sending mode.

The second touch terminal is tested, to be confirmed whether at the scope of the first touch terminal's communication.

Step S103: Detect N times continuously, if yes, execute step S104, if not, execute step S107.

When the first touch terminal test N times continuously that the second touch terminal is located at the communication scope of the first touch terminal, the test succeeds. Judge the second touch terminal is located at the communication scope of the first touch terminal, execute step S104, in which N is a preset number, N≥1, the specific value of number is set according practical situation.

Step S104: Send the communication of request.

When the first touch terminal tests the second touch terminal is located at the communication scope of the first touch terminal, the first touch terminal sends the request of building wireless near field communication to the second touch terminal, through near field electric field.

Step S105: Close interference source peripherals.

The first touch terminal sends the close signal of interference sources peripherals through control unit, informing main control chip to close interference sources peripherals. The interference sources peripherals mainly are LCD, but not limited to it as above content mentions. The main control can close the interference sources peripherals directly, and can also judge whether interference can be avoided, to confirm whether closure of interference sources peripherals is needed or not. The interference sources peripherals should be closed only when the communication frequency can not avoid the interference frequency.

Step S106: Communicate.

The first touch terminal and the second touch terminal build wireless connection through the near field electric field, and exchange date.

In the embodiment, as prior application method, the first touch terminal can send pilot connection information, after connects the second touch terminal successfully, to confirm the real existence of the second touch terminal in case of any mistake test. If the pilot frequency fails, try again. If fails after Q1 times trail, failure is confirmed, then inform main chip to handle accordingly. When pilot frequency succeeds, sending date starts. After date is sent successfully, inform main chip to handle accordingly. Failure may happen at the sending process, for instance, one device moves beyond of the communication scope. The date sending will try again after failure. If the date sending fails after trial Q2 times, failure will be judged, in which Q1 and Q2 are preset number, Q1≥1, Q2≥1, and the specific value of number can be set according to practical situation. After the date sending is finished and the communication ends, the interference sources peripherals will open again.

Step S107: Estimate the receiver (namely as a second touch terminal of date sender) be not tested in X minutes. If yes, execute step S108, or, go back to step S103.

Timeout is set in the embodiment, then the first touch terminal can not test the second touch terminal at the scope of communication in X minutes, the test fails, in which X is a preset time period, and the specific value of number can be set according to practical situation. The set of timeout can deduce the power consumption of touch terminal, and allow more sources to be used at touch control test.

Step S108: Return the touch detection mode.

Test fails, the first touch terminal quit the proximity detection mode, and return the normal touch detection mode.

Embodiment 5

The embodiment 5 of the disclosure provides a touch terminal as a date receiver, which is called a second touch terminal hereafter, as date sender as well. The embodiment mainly describes the flowchart of the touch terminal as date receiver. The component of the touch terminal has been described in detail in embodiment 3, which will not be described any more here.

Figure 5:
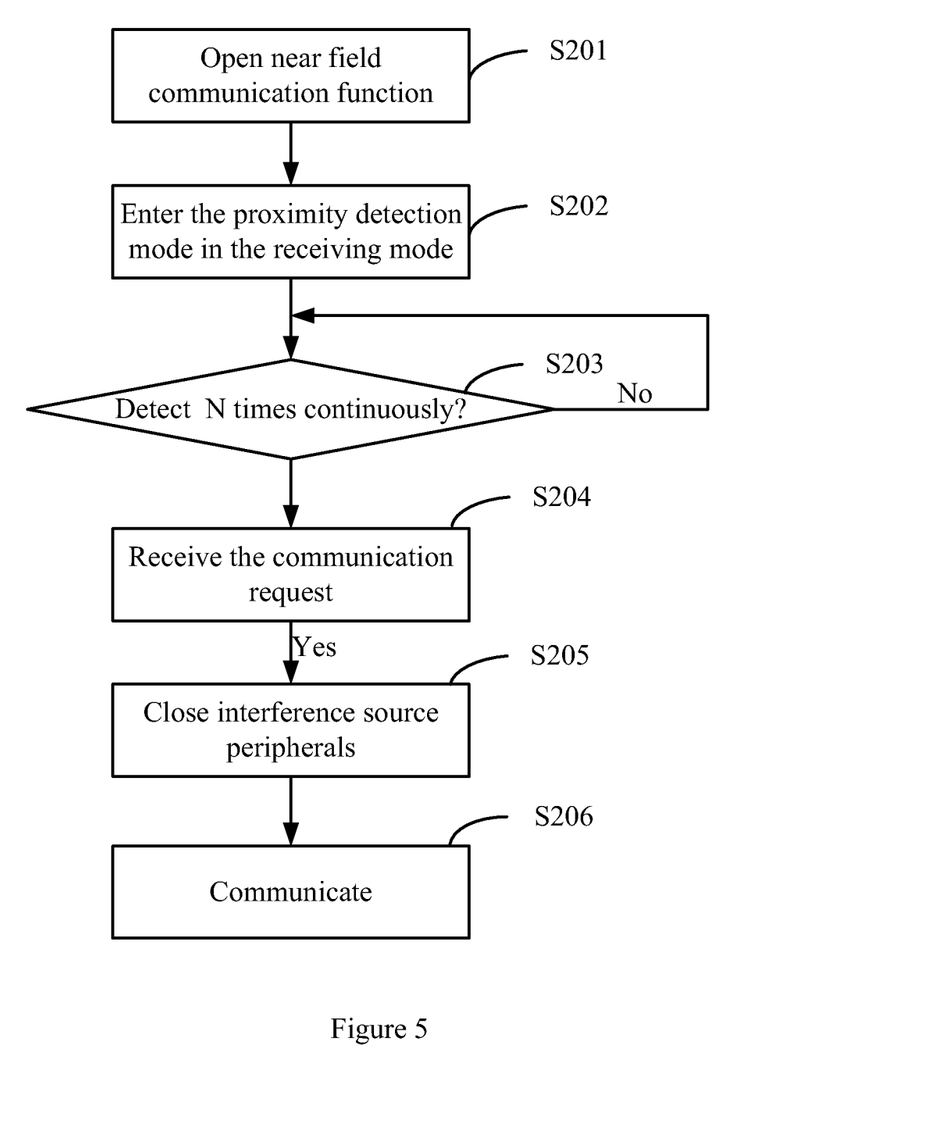
FIG. 5 shows a workflow chart of the embodiment 5 of the second touch terminal as being data receiving terminal according to the disclosure.

Referring to FIG. 5, which shows a workflow chart of the embodiment 5 of the second touch terminal as being data receiving terminal according to the disclosure, as below in detail:

Step S201: Open near field communication function.

Specifically, users' operating open near field communication function, for instance, users make choice in the related menu of to be send date, to open the near field communication function of touch terminal. The detail of application has been described in embodiment 1, which will not be described any more here.

Step S202: Enter the proximity detection mode in the receiving mode.

The first touch terminal is tested, to be confirmed whether at the scope of the second touch terminal's communication. At the same time, user can switch to date sending mode at any moment.

Step S203: Detect N times continuously, if yes, execute step S204, if not, execute step S203.

When the second touch terminal test N times continuously that the first touch terminal is located at the communication scope of the first touch terminal, the test succeeds. Judge the first touch terminal is located at the communication scope of the second touch terminal, execute step S204, in which N is a preset number, N≥1, the specific value of number is set according practical situation.

Step S204: Receive the communication request.

When the second touch terminal tests the first touch terminal is located at the communication scope of the second touch terminal, the second touch terminal receives the request of building wireless near field communication from the first touch terminal, through near field electric field.

Step S205: Close interference sources peripherals.

The second touch terminal sends the close signal of interference sources peripherals through control unit, informing main control chip to close interference sources peripherals. The interference sources peripherals mainly are LCD, but not limited to it as above content mentions. The main control can close the interference sources peripherals directly, and can also judge whether interference can be avoided, to confirm whether closure of interference sources peripherals is needed or not. The interference sources peripherals should be closed only when the communication frequency can not avoid the interference frequency.

Step S206: Communicate.

The first touch terminal and the second touch terminal build wireless connection through the near field electric field, and exchange date.

In the embodiment, as prior application method, the touch terminal can send pilot connection information, after connects the first touch terminal successfully, to confirm the real existence of the second touch terminal in case of any mistake test. If the pilot frequency fails, try again. If fails after Q1 times trail, failure is confirmed, then inform main chip to handle accordingly. When pilot frequency succeeds, sending date starts. After date is sent successfully, inform main chip to handle accordingly. Failure may happen at the sending process, for instance, one device moves beyond of the communication scope. The date sending will try again after failure. If the date sending fails after trial Q2 times, failure will be judged, in which Q1 and Q2 are preset number, $Q1 \geq 1$, $Q2 \geq 1$, and the specific value of number can be set according to practical situation. After the date sending is finished and the communication ends, the interference sources peripherals will open again.

Figure 6:
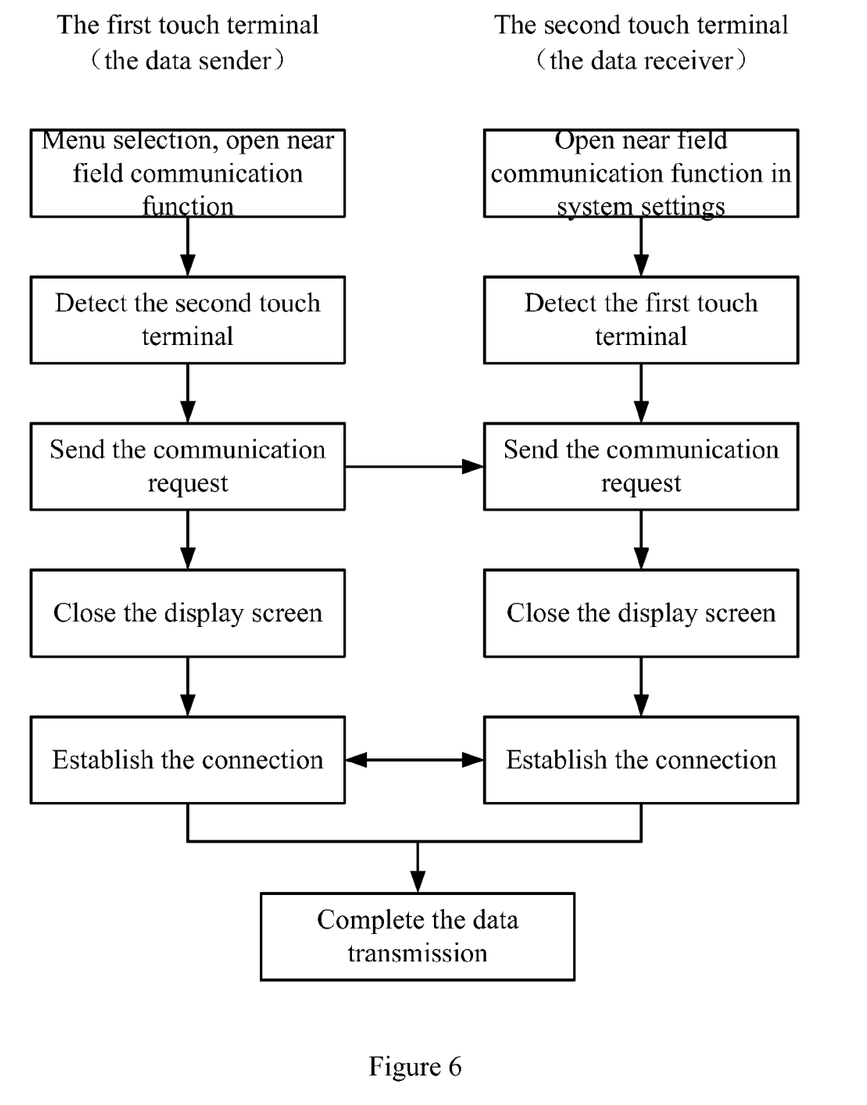
FIG. 6 shows a workflow chart of the embodiment 4 and embodiment 5 of realizing near field communication between the touch terminals according to the disclosure.

The following introduce a workflow chart of the embodiment 4 and embodiment 5 of realizing near field communication between the touch terminals according to the disclosure. Referring FIG. 6, describe as following:

The first touch terminal (the data sender) opens near field communication function through menu selection; the second touch terminal (the data receiver) opens near field communication function in system settings. After that, the two terminals enter the proximity detection mode, as to detect whether there are other communications equipment peer to peer within communication range. After the two terminals near each other, each other can be detected, then the first touch terminal sends a communication request to the second touch terminal, a second touch terminal receives a communication request sent by the first touch terminal. For example, when the screen of the two touch terminal with near-field communication function is face to face, the distance is less than 5 millimeters, when the touch terminal detects the presence of the other touch terminal around, the party sends the request, and the other party receives the request. After that, each informs the main control chip to close interference source peripherals, and enter into the communication stage, the two terminals establish a connection, complete data transmission, the data which can be transferred include but not limit to the URL, business cards etc. When needing to transfer large files, as the preferred option, users can also carry out Bluetooth pairing after establishing a connection, and establish a Bluetooth connection, and transfer large by Bluetooth, which is faster and have longer communicate distances. A number of small files such as number, URLs, etc. can be transmitted directly through the near-field communication. Of course, the first touch terminal and the second touch, which can be used as the data sender and the date receiver, both have the function of data sending and data receiving, the above description is only to illustrate the workflow of the near field communication, and does not mean that the first touch terminal is only used as the data sender, or the second touch terminal is only used as a data receiver.

In addition, there will exist the following problems if either the multiplex driving line or the sensor cable channel is used as a communication channel: when using the pattern of a single-chip NFC chip plus a touch chip, they can communicate and touch simultaneously, because the two functions is completed by two independent chip; when the sending channels and the receiving channels are multiplexed the driving line terminal, the line sensor of the touch screen, because of the multiplex driving line and the sensor wire channels, the touch detection and communication can not proceed simultaneously, the user experience is not very good at the moment. Therefore, in the multiplex mode, in order to improve the user experience, the disclosure is designed as following to reduce the impact of user experience:

In order to obtain faster speed, the proximity detection duration of the first touch terminal is not less than sum of the touch detection duration of the second touch terminal and the two proximity detection duration, wherein the first touch terminal serves as the data sender and the second touch terminal serves as the data receiver. And when the touch detection and proximity detection can not be performed simultaneously, using time division manner, and after entering into the proximity detection mode, the touch detection and proximity detection proceed phase to phase. The benefits of above design are: when the touch detection and communication cannot proceed simultaneously, the response speed of proximity detection is faster, and improve the user experience.

Figure 7:
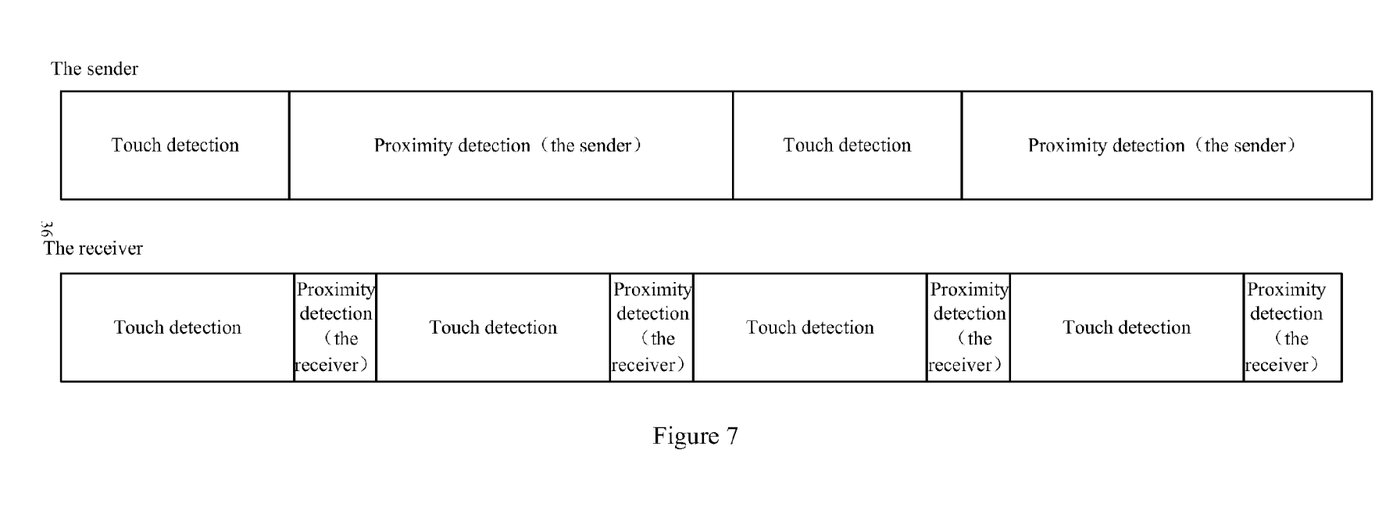
FIG. 7 shows a sequence chart of the embodiment 4 and embodiment 5 of macroscopic detection between the touch terminals according to the disclosure is performed between the detected proximity touch and the terminal according to Example 4 Example 5 provides a timing diagram of the embodiment of the macro-detection of the present disclosure.

Referring to FIG. 7, which shows a sequence chart of the embodiment 4 and embodiment 5 of macroscopic detection between the touch terminals according to the disclosure. The first touch terminal being as the data sender (hereinafter the sender) proceed the touch detection in the first period, and detects the touch position, and proceed the proximity detection in the second period, and detects the presence of the data receiver to communicate with. The duration of proximity detection of the sender is long, which is designed to detect the second touch terminal being as the data receiver (hereinafter the receiver) quickly, and so on. Therefore, the refresh rate of touch detection will decrease, but because the user is known to the detection of the receiver this time, the touch performance decreased slightly, which is acceptable for users. Detection of the receiver has the similar process, except that the duration of proximity detection is short. Because of opening near field communication in the system settings, after opening the proximity detection will be proceed all along, so the impact on the performance of the touch is ongoing until closing near field communication in the system settings, so here a shorter duration of proximity detection is designed in order to guarantee a certain refresh rate of touch detection, and improve the user experience. The proximity detection duration of the sender is more than sum of the touch detection duration of the receiver and the two proximity detection duration, which can detect the presence of the receiver one time, the receiver can be guaranteed to detect the presence of a sender in a period.

Figure 8:
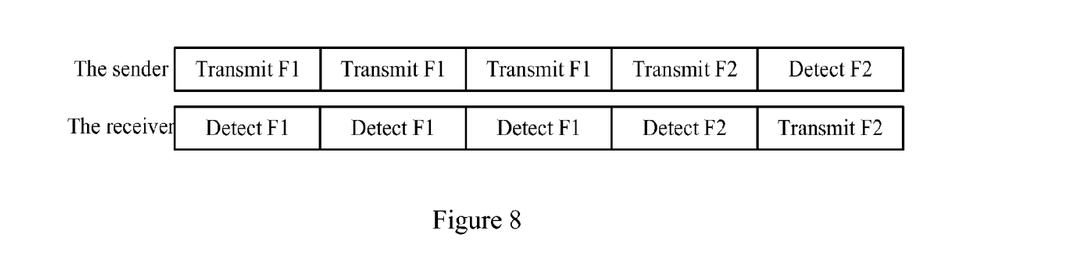
FIG. 8 shows a sequence chart of the embodiment 4 and embodiment 5 of microscopic detection between the touch terminals according to the disclosure.

Referring to FIG. 8, which shows a sequence chart of the embodiment 4 and embodiment 5 of microscopic detection between the touch terminals according to the disclosure. The touch terminal transmits a particular undisturbed beacon as following, and detects whether there is an undisturbed beacon reply with a particular rule, for detecting whether there is the other touch terminal is located in the communication range of the touch terminal. For example, the sender and the receiver may agree that F1 as being the sender exists a beacon, F2 as being the receiver exists a beacon. As the touch terminal as being the sender, when transmitting M times, the sender exists a beacon F1, and when transmitting P times, the receiver exists a beacon F2, and the receiver detects the receiver of the date receiver postback exists a beacon F2, and wherein M and P are the default number, which can be provided on demand, M≥1, P≥1; M of the embodiment is 3, which can make the receiver confirm the presence of the sender reliably, P is 1, but not to limit thereto;

When the touch terminal is the data receiver, the touch terminal detects the presence of the beacon F1 of the sender and the presence of the beacon F2 of the receiver, and when detect the presence of the beacon F1 of the sender and the presence of the beacon F2 of the receiver, post back the existence of the beacon F2 of the receiver.

The process is similar to the process of communication handshake, which is used to detect the presence of another communication equipment, and provide information to close the interference source peripherals. Of course, the beacon is not limited to a specific rule to use only two beacons F1 and F2, the above-mentioned description is only illustrative, in specific applications may be used, for example, more F1, F2 and F3 to send a response with a certain rule, as for confirming the close of another device; there even can use more beacons, wherein F1, F2 and F3, which are selected from F1, F2, F3, . . . , Fm, are an undisturbed beacon.

The above described embodiments, for convenience of description, are adopted the process of using half-duplex communication to illustrate, and to distinguish the sender and receiver, but the principles of above described embodiments are equally applicable to the full-duplex communication.

The above description is only the preferred examples of the present document, which is not used to limit the present document. The present document can have various modifications and changes for the skilled in the art. All the modifications, equivalent substitutions, and improvements, etc. made within the spirit and principle of the present document shall fall into the protection scope of the present document.

INDUSTRIAL APPLICABILITY

The above embodiment has the following advantages: polling script packets can be combined flexibly and can be extended conveniently; the polling sub-system can log in multiple apparatuses simultaneously to perform polling, which improves the polling efficiency; and the polling sub-system can reduce manual interventions, perform polling automatically and generate the polling report automatically, which has comparatively strong usability and can enhance serviceability of the communication apparatus.

What is claimed is:

1. A near field communication method of a touch terminal, which is used for near field communication between a first touch terminal and a second touch terminal, the method comprising:

the first touch terminal and the second touch terminal obtaining a user operation of opening near field communication function, and opening the near field communication function;

the user operation of opening the near field communication function comprising the user operation for selecting in a relevant menu of data to be transmitted and the user operation for opening the near field communication function in touch terminal system settings;

the first touch terminal detecting whether the second touch terminal is located in a communication range of the first touch terminal, if located, the first touch terminal sends a wireless communication request of establishment of the near field communication to the second touch terminal through a near field electric field;

the first touch terminal entering a proximity detection mode in a sending mode for detecting whether the second touch terminal is located in the communication range of the first touch terminal;

the second touch terminal detecting whether the first touch terminal is located in the communication range of the second touch terminal, if located, the second touch terminal receives the wireless communication request of establishment of the near field communication sent by the first touch terminal through the near field electric field;

the second touch terminal entering the proximity detection mode in a receiving mode for detecting whether the first touch terminal is located in the communication range of the second touch terminal;

the second touch terminal receiving the wireless communication request of establishment of the near field communication sent by the first touch terminal through the near field electric field;

the second touch terminal sending an interference source peripherals closing signal to a main control chip, and informing the main control chip to close the interference source peripherals;

the first touch terminal and the second touch terminal establishing a wireless connection by touching the near field electric field, and exchanging data; wherein a proximity detection duration of the first touch terminal is not less than a sum of touch detection duration and two proximity detection duration of the second touch terminal;

when a touch detection and a proximity detection cannot be performed simultaneously, the touch detection and the proximity detection can be performed alternately after entering the proximity detection mode.

2. The method according to claim 1, wherein the first touch terminal detecting whether the second touch terminal is located in the communication range of the first touch terminal comprises:

the first touch terminal detecting the second touch terminal locating in the communication range of the first touch terminal N times continuously, and judging the second touch terminal is located in the communication range of the first touch terminal, wherein N is a preset number, N≥1; the first touch terminal cannot detect the first touch terminal locating in the communication range of the second touch terminal in a preset period of time, and judging the detecting fails, the first touch terminal quits the proximity detection mode and returns to the normal touch detection mode;

wherein the second touch terminal detecting whether the first touch terminal is located in the communication range of the second touch terminal comprises:

the second touch terminal detecting the first touch terminal locating in the communication range of the first touch terminal N times continuously, and judging the first touch terminal is located in the communication range of the second touch terminal, wherein N is a preset number, N≥1.

3. The method according to claim 1, wherein after the second touch terminal sending an interference source peripherals closing signal to the main control chip, and informing the main control chip to close interference source peripherals, the method further comprising:

the main control chip judging whether a communication frequency between the second touch terminal and the first touch terminal can avoid an interfering frequency of the interference source peripherals, if the judgment is YES, the first touch terminal and the second touch terminal establish a wireless connection by touching the near field electric field, and exchange the data; if the judgment is NO, the main control chip closes the interference source peripherals, then, the first touch terminal and the second touch terminal establish a wireless connection by touching the near field electric field, and exchange the data.

4. The method according to claim 1, wherein the first touch terminal detecting whether the second touch terminal is located in the communication range of the first touch terminal comprises:
the first touch terminal transmitting a particular undisturbed beacon and detecting whether there is an undisturbed beacon reply with a particular rule, thereby detecting whether the second touch terminal is located in the communication range of the first touch terminal;
wherein the second touch terminal detecting whether the first touch terminal is located in the communication range of the second touch terminal comprises:
the second touch terminal transmitting a particular undisturbed beacon and detecting whether there is an undisturbed beacon reply with a particular rule, thereby detecting whether the first touch terminal is located in the communication range of the second touch terminal.

5. A near field communication system of a touch terminal comprising:
a first touch terminal, which sends a wireless communication request of establishment of a near field communication through a sending electrode;
a second touch terminal, which receives the wireless communication request of establishment of the near field communication through the sending electrode sent by the first touch terminal through a receiving electrode, and sends an interference source peripherals closing signal to a main control chip, and informs the main control chip to close an interference source peripherals;
the first touch terminal and the second touch terminal establish a wireless connection by touching a near field electric field, and exchange data; wherein
the first touch terminal and the second touch terminal obtain a user operation of opening a near field communication function, and open the near field communication function;
the user operation of opening the near field communication function comprises the user operation for selecting in a relevant menu of data to be transmitted and the user operation for opening the near field communication function in touch terminal system settings;
the first touch terminal detects whether the second touch terminal is located in a communication range of the first touch terminal, if located, the first touch terminal sends the wireless communication request of establishment of the near field communication to the second touch terminal through the near field electric field;
the first touch terminal enters a proximity detection mode in a sending mode for detecting whether the second touch terminal is located in the communication range of the first touch terminal;
the second touch terminal detects whether the first touch terminal is located in the communication range of the second touch terminal, if located, the second touch terminal receives the wireless communication request of establishment of the near field communication sent by the first touch terminal through the near field electric field;
the second touch terminal enters the proximity detection mode in a receiving mode for detecting whether the first touch terminal is located in the communication range of the second touch terminal;
a proximity detection duration of the first touch terminal is not less than a sum of touch detection duration and two proximity detection duration of the second touch terminal;
when a touch detection and a proximity detection cannot be performed simultaneously, the touch detection and the proximity detection can be performed alternately after entering the proximity detection mode.

6. A touch terminal, comprising: a near field communication unit, which establishes a wireless connection with other touch terminal by touching a near field electric field for exchanging data;
the near field communication unit comprising a sending electrode and a receiving electrode, the sending electrode sending a wireless communication request of establishment of a near field communication to the other touch terminal, the receiving electrode receiving the wireless communication request of establishment of the near field communication sent by the other touch terminal;
a control unit, which receives the wireless communication request of establishment of the near field communication sent by the other touch terminal, and sends an interference source peripherals closing signal to a main control chip, and informs the main control chip to close interference source peripherals; wherein
the touch terminal detects whether the other touch terminal is located in a communication range of the touch terminal, if located, the touch terminal sends the wireless communication request of establishment of the near field communication to the other touch terminal through the near field electric field;
the touch terminal enters a proximity detection mode in a sending
mode for detecting whether the other touch terminal is located in the communication range of the touch terminal;
the touch terminal is detected by the other touch terminal whether the touch terminal is located in the communication range of the other touch terminal, if located, the wireless communication request of establishment of the near field communication sent by the touch terminal through the near field electric field is received by the other touch terminal;
detecting whether the touch terminal is located in the communication range of the other touch terminal is performed by the other touch terminal entering the proximity detection mode in the receiving mode;
a proximity detection duration of the touch terminal is not less than a sum of touch detection duration and two proximity detection duration of the other touch terminal;
when a touch detection and a proximity detection cannot be performed simultaneously, the touch detection and the proximity detection can be performed alternately after entering the proximity detection mode.

7. The touch terminal according to claim 6, wherein the sending electrode is a touchscreen driving electrode of the touch terminal, wherein the receiving electrode is a touch-screen sensing electrode of the touch terminal.

* * * * *